United States Patent [19]

Saito et al.

[11] Patent Number: 5,597,638

[45] Date of Patent: Jan. 28, 1997

[54] MAGNETIC RECORDING MEDIUM

[75] Inventors: Shinji Saito; Nobuo Yamazaki, both of Kanagawa, Japan

[73] Assignee: Fuji Photo Film Co., Ltd., Kanagawa, Japan

[21] Appl. No.: 181,239

[22] Filed: Jan. 13, 1994

[30] Foreign Application Priority Data

Jan. 13, 1993 [JP] Japan .................................. 5-004206

[51] Int. Cl.$^6$ .............................. B05D 5/12; G11B 5/66; G11B 5/70

[52] U.S. Cl. .......................... 428/141; 427/131; 428/336; 428/694 B; 428/694 BS; 428/694 BR; 428/694 BN; 428/694 BH; 428/694 BM; 428/900

[58] Field of Search ................................. 428/336, 694 B, 428/694 BS, 694 BN, 694 BA, 694 BH, 694 BM, 694 BR, 141, 329, 900; 427/128, 130, 131

[56] References Cited

U.S. PATENT DOCUMENTS

| 4,396,668 | 8/1983 | Saito et al. | 428/220 |
| 4,442,159 | 4/1984 | DeZawa et al. | 428/212 |
| 4,720,411 | 1/1988 | Shimozawa et al. | 428/141 |
| 5,098,773 | 3/1992 | Saito et al. | 428/212 |
| 5,188,907 | 2/1993 | Kawahara et al. | 428/694 R |

FOREIGN PATENT DOCUMENTS 5448504  3/1979  Japan .

*Primary Examiner*—D. S. Nakarani
*Assistant Examiner*—Stephen Sand
*Attorney, Agent, or Firm*—Sughrue, Mion, Zinn, Macpeak & Seas

[57] ABSTRACT

The present invention provides a magnetic recording medium comprising a nonmagnetic layer mainly having an inorganic nonmagnetic particle dispersed in a binder provided on a nonmagnetic flexible support and a magnetic layer having a ferromagnetic particle dispersed in a binder, characterized in that the magnetic layer comprises a hexagonal ferrite magnetic material and exhibits a thickness of 1 μm or less, or 2.5 μm or less in total if there are a plurality of magnetic layers, a central line average surface roughness of 0.006 μm or less, SFD of 0.3 or less in the longitudinal direction on the plane and Br/Hc of less than 1.5, whereby the short wavelength recording can be remarkably improved in electro-magnetic conversion characteristics, particularly 7 MHz output.

19 Claims, No Drawings

MAGNETIC RECORDING MEDIUM

FIELD OF THE INVENTION

The present invention relates to a magnetic recording medium for high density recording comprising two or more magnetic layers or nonmagnetic layers wherein a hexagonal ferrite magnetic material is contained in the uppermost layer.

BACKGROUND OF THE INVENTION

As a magnetic recording medium such as video tape, audio tape and magnetic disc there has been heretofore widely used one comprising a magnetic layer having a ferromagnetic iron oxide particle, Co-modified ferromagnetic iron oxide particle, $CrO_2$ particle, ferromagnetic alloy particle or the like dispersed in a binder coated on a nonmagnetic support. However, since such a magnetic material is normally acicular and magnetized longitudinally, it encounters a trouble that it exhibits an increased self-demagnetization and thus cannot provide a sufficient output in the recent requirement for short wavelength recording. JP-A-58-6525 and JP-A-61-273735 (The term "JP-A" as used herein means an "unexamined published Japanese patent application") propose a magnetic recording medium comprising a hexagonal ferrite magnetic material having a magnetizable axis in the vertical direction on the plane. However, since the hexagonal ferrite magnetic material exhibits a poor dispersibility, it, if used as it is, gives a rough surface and hence a space loss, making it impossible to obtain a sufficient output. The hexagonal ferrite magnetic material is also disadvantageous in that it exhibits a small saturated magnetization and thus gives a low long wavelength output.

In the past, many attempts have been made to produce signals having different recording wavelengths at a high output by providing two or more magnetic layers. These attempts are too numerous to mention. For example, JP-B-37-2218 (The term "JP-B" as used herein means an "examined Japanese patent publication") discloses such an attempt. In many of these attempts, the coercive force (Hc), maximum flux density (Bm) and grain size of magnetic material differ from the upper layer to the lower layer for the purpose of providing a high output and a high C/N. Examples of an magnetic recording medium comprising two or more magnetic layers wherein the upper layer comprises a hexagonal ferrite are disclosed in JP-A-60-223018 and JP-A-1-251427. However, since such a magnetic recording medium has a rough surface due to the use of a magnetic material as a lower layer, comprises a thick lower layer and exhibits a wide distribution of coercive force of hexagonal ferrite magnetic material, it cannot provide sufficient characteristics for high density recording.

On the other hand, in the recent tendency for higher density combined with shorter recording wavelength, paying attention to the fact that when the thickness of a magnetic layer is great, a problem grows that self-demagnetization loss during recording and thickness loss during reproduction cause an output drop, the thickness of the magnetic layer has been reduced. However, when the magnetic layer is thinned to about 2.5 µm or less, the effect of the nonmagnetic support can easily appear on the surface of the magnetic layer, giving a tendency for worse electromagnetic conversion characteristics or more dropouts (DO). The effect of the surface roughness of the support can be eliminated by providing a thick nonmagnetic subbing layer on the surface of the support before coating the magnetic layer as an upper layer as disclosed in JP-A-57-198536. However, this approach is disadvantageous in that the head abrasion resistance or durability cannot be improved. This is possibly because that the nonmagnetic lower layer has heretofore comprised a thermosetting resin as a binder. That is, the lower layer hardens, making the magnetic layer to come into cushionless contact with the head and other members. Further, a magnetic recording medium having such a lower layer exhibits a slightly poor flexibility.

In order to eliminate these disadvantages, the lower layer may comprise a non-curing resin as a binder as disclosed in JP-A-63-191315. However, in the conventional process, if a magnetic layer is coated as an upper layer after the drying and drying of a lower layer, the lower layer swells in an organic solvent in the coating solution in the upper layer, causing a turbulence or the like in the upper layer coating solution. This leads to poor surface properties of the magnetic layer that cause deteriorated electromagnetic conversion characteristics or like troubles. Further, the reduction of the thickness of the magnetic layer may be accomplished by reducing the coated amount of the coating solution or adding a large amount of a solvent to the magnetic coating solution to reduce the concentration thereof. In the former approach, the reduction of the coated amount of the coating solution gives no sufficient time for leveling before the magnetic solution thus coated begins to dry. This causes troubles such as coating defect, e.g., patterning of stripes or marks, remarkably reducing the yield. In the latter approach, the reduction of the concentration of the magnetic coating solution causes many voids to occur in the resulting coated film, making it impossible to provide a sufficiently packed magnetic material. These voids also cause various troubles such as insufficient film strength. Thus, JP-A-62-154225 has a great disadvantage that it provides a poor yield.

One of the approaches for resolving these problems is to employ a simultaneous multilayer coating method by which a nonmagnetic layer is provided as a lower layer, followed by the coating of a high concentration magnetic coating solution to a small thickness, as disclosed in JP-A-63-191315 and JP-A-63-187418. This approach provides a drastic enhancement of yield, making it possible to obtain excellent electromagnetic conversion characteristics. However, the recent magnetic recording medium has been required to reach a higher density.

JP-A-2-254623 focuses on switching field distribution (SFD). This application discloses a magnetic recording medium comprising a plurality of magnetic layers provided on a nonmagnetic support, characterized in that SFD of the uppermost magnetic layer is from 0.4 to 0.7 and SFD of the magnetic layers other than the uppermost magnetic layer are from 0.2 to 0.4. However, if SFD of the uppermost magnetic layer is great, neither 7 MHz output nor 2 MHz output are excellent.

Another application that focuses on SFD is JP-A-2-240824. In this application, SFD of the second (upper) magnetic layer is 0.6 or less. The residual flux density (Br)/coercive force (Hc) ratio (Br/Hc) of the second (upper) magnetic layer is $2 \times 10^{-6}$ H/m or more. Further, the central line average surface roughness and coercive force (Hc) are defined.

However, it was found that if Br/Hc is $2 \times 10^{-6}$ H/m or more (MKSA unit), or 1.59 or more in CGS unit, there is disadvantageously shown a remarkable drop in 7 MHz output.

SUMMARY OF THE INVENTION

It is therefore an object of the present invention to provide a magnetic recording medium which exhibits excellent electromagnetic conversion characteristics particularly in short wavelength signal recording.

The foregoing object of the present invention will become more apparent from the following detailed description and examples.

In order to obtain a magnetic recording medium which exhibits excellent electromagnetic conversion characteristics particularly in short wavelength signal recording, the inventors made extensive studies on the layer configuration of a magnetic recording medium comprising two or more magnetic layers or nonmagnetic layers and the physical properties of magnetic materials or magnetic layers contained in the magnetic recording medium. As a result, it was found that the shortwave output can be remarkably enhanced with a layer configuration wherein the uppermost layer comprises a hexagonal ferrite magnetic material and exhibits a switching field distribution (SFD) of 0.3 or less in the longitudinal direction on the plane and a residual magnetic flux density (Br)/coercive force (Hc) ratio (Br/Hc) of less than 1.5 in CGS unit. The first embodiment of the layer configuration which exerts the effects of the present invention is a magnetic recording medium comprising a nonmagnetic layer provided on a nonmagnetic flexible support and a magnetic layer provided thereon. The second embodiment is a magnetic recording medium comprising a first magnetic layer provided on a nonmagnetic flexible support and a second magnetic layer provided thereon. The third embodiment is a magnetic recording medium comprising a nonmagnetic layer provided on a nonmagnetic flexible support and first and second magnetic layers provided thereon in this order.

Specifically, this and other objects of the present invention are accomplished with a magnetic recording medium comprising a nonmagnetic layer mainly having a nonmagnetic particle dispersed in a binder provided on a nonmagnetic flexible support and a magnetic recording layer having a magnetic material dispersed in a binder provided on the nonmagnetic layer, wherein the magnetic layer comprises a hexagonal ferrite magnetic material and has a thickness of 1 μm or less, a central line average surface roughness according to JIS B 0601 (cut off: 0.08 mm) of 0.006 μm or less, a switching field distribution (SFD) of 0.3 or less in the longitudinal direction on the plane and a residual magnetic flux density (Br)/coercive force (Hc) ratio (Br/Hc) of less than 1.5 in CGS unit.

Further, this and other objects of the present invention are accomplished with a magnetic recording medium comprising a first magnetic layer mainly having a ferromagnetic acicular particle dispersed in a binder provided on a nonmagnetic flexible support and a second magnetic layer having a magnetic material dispersed in a binder provided on the nonmagnetic layer, wherein the second magnetic layer comprises a hexagonal ferrite magnetic material, the total thickness of the magnetic layers is 2.5 μm or less, a central line average surface roughness (cut off: 0.08 mm) of 0.006 μm or less, a switching field distribution (SFD) of 0.3 or less in the longitudinal direction on the plane and a residual magnetic flux density (Br)/coercive force (Hc) ratio (Br/Hc) of less than 1.5 in CGS unit.

Moreover, this and other objects of the present invention are accomplished with a magnetic recording medium comprising a nonmagnetic layer mainly having a nonmagnetic particle dispersed in a binder provided on a nonmagnetic flexible support and first and second magnetic layers having a magnetic material dispersed therein provided on the nonmagnetic layer in this order, wherein the first magnetic layer comprises a ferromagnetic acicular particle, the second magnetic layer comprises a hexagonal ferrite magnetic material, the total thickness of the magnetic layers is 2.5 μm or less and the second magnetic layer has a central line average surface roughness (cut off: 0.08 mm) of 0.006 μm or less, a switching field distribution (SFD) of 0.3 or less in the longitudinal direction on the plane and a residual magnetic flux density (Br)/coercive force (Hc) ratio (Br/Hc) of less than 1.5 in CGS unit.

DETAILED DESCRIPTION OF THE INVENTION

In the present invention, SFD stands for Switching Field Distribution which indicates the distribution of a switching field or Hc in the magnetic layer. SFD is represented by the value obtained by dividing the half value width on the differential curve of the magnetic hysteresis loop of 5 kOe magnetic field by Hc.

In the present invention, the use of a hexagonal ferrite magnetic material having a small SFD value provides a remarkable rise in the output of shortwave recording. This is a result of combined effects with the reduction of the central line surface roughness of the magnetic layer. In other words, the small SFD is, the sharper is the switching of magnetization. The switching of magnetization becomes sharper also when the surface roughness of the magnetic layer is reduced. This effect comes as a synergism of both the effects rather than a combination of both the effects. Even when SFD is small enough, its effect cannot be thoroughly exerted if the surface roughness of the magnetic layer is not sufficiently small. SFD changes with Hc distribution in the magnetic material and the degree of orientation in the magnetic material. This tendency appears particularly strong in a hexagonal ferrite magnetic material, which exhibits a strong magnetic anisotropy.

The reduction of the surface of the magnetic layer can be accomplished by the reduction of the surface roughness of the nonmagnetic support. It can be also accomplished by altering the degree of dispersion of a magnetic coating or selecting the presence or absence of calendering or altering the degree of calendering.

In the present invention, when the magnetic layer is a single layer, the residual magnetic flux density (Br)/coercive force (Hc) ratio (Br/Hc) needs to be less than 1.5. This is because that the reduction of Br/Hc to less than 1.5 provides a remarkable reduction of demagnetization. When Br/Hc exceeds 1.5, the self-demagnetization becomes greater, widening the switching width of magnetization. A greater Br means a greater magnetizability. A greater Hc means a lower demagnetizability. Thus, when Br/Hc is less than 1.5, the switching of magnetization advantageously becomes sharp. Br/Hc is preferably from 0.5 to 1.2.

The hexagonal ferrite magnetic material contained in the uppermost layer according to the present invention normally is tabular and has a magnetizable axis in the vertical direction on the plane. By allowing such a magnetic material to be present on the surface layer, short wavelength signals can be effectively recorded. However, this approach is not enough to provide desirable properties. As mentioned herein, when SFD is 0.3 or less, the central line average surface roughness is 0.006 μm or less, and the total thickness of the magnetic layers is 2.5 μm or less, preferably 1 μm or less, there can be provided remarkable improvements in the properties. The reason for this improvement is not obvious but can be thought as follows. A small SFD means that the distribution of coercive force among the magnetic grains is narrow, resulting in a reduced self-demagnetization or recording demagnetization and a reduced magnetization switching width. Further, the reduction of the surface roughness to 0.006 μm or less suppresses the effect of expansion of head magnetic field, resulting in a reduced recording demagnetization and a reduced magnetization switching width. Moreover, the reduction of the total thickness of the magnetic layers to 2.5 μm or less, preferably 1 μm or less results in a reduced self-demagnetization caused by opposite magnetic field. It can therefore be presumed that these three effects together provide a remarkable enhancement of short wavelength output in particular. It should be noted that if these three requirements are not met at the same time, desirable effects cannot be obtained. SFD is preferably 0.2 or less, more preferably 0.1 or less. The central line average surface roughness is preferably 0.002 μm or less, more preferably 0.004 μm or less.

The present invention will be further described with reference to preferred embodiments thereof. When the thickness of the magnetic layer comprising a hexagonal ferrite magnetic material is from 0.005 μm to 0.5 μm, the effects of the present invention can be exerted more strongly.

When the squareness ratio (SQ) of the second magnetic layer in the longitudinal direction on the plane is smaller than that of the first magnetic layer in the longitudinal direction on the plane, the vertical magnetizable component of the second magnetic layer is increased, enhancing the short wavelength output. The squareness ratio (SQ) of the first and second magnetic layers in the longitudinal direction on the plane are preferably in the following ranges, respectively:

0.7≦squareness ratio (SQ) of the first magnetic layer and 0.9≧squareness ratio (SQ) of the second magnetic layer.

The maximum saturated magnetic flux density (Bm) of the first magnetic layer is preferably high to enhance the long wavelength output. On the other hand, when the maximum saturated magnetic flux density (Bm) of the second magnetic layer is high, it has a great effect of self-demagnetization, resulting in a reduced short wavelength output. Thus, the maximum saturated magnetic flux density of the first and second magnetic layers are preferably in the following ranges, respectively:

1,500 G≦maximum saturated magnetic flux density (Bm) of the first magnetic layer and 2,500 G≧maximum saturated magnetic flux density (Bm) of the second magnetic layer.

When the coercive force (Hc) of the first magnetic layer is low, the long wavelength output is enhanced. When the coercive force (Hc) of the second magnetic layer is high, the short wavelength output is enhanced. The coercive force of these magnetic layers need to be optimally predetermined depending on the wavelength of recorded signal and are preferably in the following ranges, respectively:

500 Oe≦coercive force (Hc) of the first magnetic layer≦2,500 Oe 1,000 Oe≦coercive force (Hc) of the second magnetic layer ≦4,000 Oe.

The magnetic layer according to the present invention will be further described hereinafter.

Platy hexagonal ferrites may also be used in the uppermost magnetic layer (the second magnetic layer). These ferrites may be substituted. Suitable platy ferrites include substituted ferrites such as barium ferrite, strontium ferrite, lead ferrite, and calcium ferrite, Co-substituted ferrites, and the like, and hexagonal Co particles. Besides the atoms specified above, the ferromagnetic particles may contain other atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B. Examples of suitable platy ferrites include barium ferrite and strontium ferrite, both of the magnetoplumbite type, and barium ferrite and strontium ferrite, both of the magnetoplumbite type containing a spinel phase. More preferred are Co-substituted barium ferrite and Co-substituted strontium ferrite. In order to control coercive force, elements such as Co-Ti, Co-Ti-Zr, Co-Ti-Zn, Ni-Ti-Zn, Ir-Zn, or the like can be incorporated into the hexagonal ferrites.

In order to reduce SFD of the uppermost magnetic layer of the present invention to 0.3 or less, the coercive force distribution needs to be narrow. Examples of the method for controlling the coercive force include a method which comprises controlling the thickness of the spinel phase in the hexagonal ferrite to a predetermined value, a method which comprises controlling the amount of substituent elements in the spinel phase to a predetermined value, and a method which comprises predetermining the substitution site of the spinel phase.

Hexagonal ferrites usually are hexagonal platy particles, and the particle diameter thereof, which means the width of the hexagonal plate, is measured with an electron microscope. In the present invention, this particle diameter is preferably limited to a value in the range of from 0.01 to 0.2 μm, more preferably from 0.03 to 0.1 μm. The average thickness (plate thickness) of the fine particles of the hexagonal ferrites is preferably about from 0.001 to 0.2 μm, more preferably from 0.003 to 0.05 μm. The diameter/ thickness ratio (ratio of the particle diameter to the plate thickness) is preferably from 1 to 10, more preferably from 3 to 7. Preferably, the specific surface area of the fine particles of hexagonal ferrite, as measured by the BET method ($S_{BET}$), is from 25 to 100 m$^2$/g, preferably from 40 to 70 m$^2$/g. Specific surface areas of less than 25 m$^2$/g are undesirable because of increased noise results, while specific surface areas of more than 100 m$^2$/g are undesirable because then good surface properties are difficult to obtain. The coercive force of the magnetic layer is preferably from 1,000 to 4,000 Oe (oersted), more preferably from 1,200 to 3,000 Oe. The coercive force of the magnetic layer of less than 1,000 Oe is undesirable because short wavelength output is lowered, while the coercive force of the magnetic layer of more than 4,000 Oe is undesirable because recording at the head is difficult. The $\sigma_s$ (saturated magnetization) of the magnetic iron oxide particles is 50 emu/g or higher, preferably 60 emu/g or higher. The tap density is preferably 0.5 g/ml or higher, more preferably 0.8 g/ml or higher.

Any suitable ferromagnetic particles having an aspect ratio of 2 to 20 can be employed as the ferromagnetic particles of the first magnetic layer in the present invention. Suitable ferromagnetic particles include γ-FeOx (x=1.33 to 1.5), Co-modified γ-FeOx (x=1.33 to 1.5), fine particles of a ferromagnetic alloy containing Fe, Ni, or Co as the main component (75% by weight or more), barium ferrite and strontium ferrite. Preferred are ferromagnetic metallic fine particles containing α-Fe as a main component or a cobalt-modified iron oxide. The aspect ratio of the ferromagnetic particles is preferably from 4 to 12. Besides the atoms specified above, the ferromagnetic particles may contain other atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B. Before being dispersed, the ferromagnetic fine particles may be treated with, for example, a dispersant, lubricant, surfactant, or antistatic agent which will be described later. Suitable treatments are described in, for example, JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, and U.S. Pat. Nos. 3,026,215, 3,031,341, 3,100,194, 3,242,005 and 3,389,014.

The ferromagnetic alloy fine particles may contain a small amount of a hydroxide or oxide. Conventional methods may be used to prepare ferromagnetic alloy fine particles suitable for use in the present invention. Examples of suitable methods include: reduction with an organic acid double salt (consisting mainly of an oxalate) and a reducing gas, such as hydrogen; reducing iron oxide with a reducing gas, such as hydrogen, to obtain Fe or Fe-Co particles or the like; pyrolyzing a metal carbonyl compound; reduction by adding a reducing agent, such as sodium boron hydride, a hypophosphite, or hydrazine to an aqueous solution of a ferromagnetic metal; vaporizing a metal in a low-pressure inert gas to obtain fine particles. The ferromagnetic alloy particles may be used after being subjected to a conventional gradual oxidation treatment. This treatment may be conducted using any of the following methods: immersing the particles in an organic solvent, followed by drying; immersing the particles in an organic solvent and feeding an oxygen-containing gas to form an oxide film on the surfaces, followed by drying; forming an oxide film on the surfaces of the ferromagnetic alloy particles by controlling the partial pressures of oxygen gas and an inert gas, without using an organic solvent.

The ferromagnetic particles used in the first magnetic layer in the present invention preferably have a specific surface area as determined by the BET method of 25 to 80 $m^2/g$, preferably 40 to 70 $m^2/g$. Specific surface areas of less than 25 $m^2/g$ are undesirable because of increased noise results, while specific surface areas of more than 80 $m^2/g$ are undesirable because then good surface properties are difficult to obtain. The $\sigma_s$ (saturated magnetization) of the magnetic iron oxide particles is 50 emu/g or higher, preferably 70 emu/g or higher, while the $\sigma_s$ of the ferromagnetic metal fine particles is 100 emu/g or higher, more preferably from 110 to 170 emu/g. The coercive force of the magnetic layer is preferably from 500 to 2,500 Oe, more preferably from 800 to 2,000 Oe. The tap density is preferably 0.5 g/ml or higher, more preferably 0.8 g/ml or higher. If ferromagnetic alloy particles are used in the magnetic layer, the tap density thereof is preferably from 0.2 to 0.8 g/ml. Tap densities of more than 0.8 g/ml may result in acceleration of the oxidation of the ferromagnetic particles during compacting of the same, so that a sufficient $\sigma_s$ is difficult to obtain. If the tap density is less than 0.2 g/ml, insufficient dispersion of the ferromagnetic particles in the magnetic layer may result. If γ-iron oxide is used in the magnetic layer, the percentage of divalent iron to trivalent iron is preferably from 0 to 20% by weight, more preferably from 5 to 10% by weight. Further, the amount of cobalt atoms is from 0 to 15% by weight, preferably from 2 to 8% by weight, based on the amount of iron atoms.

Other preferred range of the ferromagnetic particles contained in the first and second magnetic layers of the present invention are as follows. The crystallite size of the ferromagnetic particles in the magnetic layer in the present invention is generally from 50 to 450 Å, preferably from 100 to 350 Å. Preferably, the ferromagnetic particles have an r1500 value of 1.5 or less, more preferably 1.0 or less, where r1500 indicates the percent retention of magnetization remaining uninverted after saturation of the magnetization of the magnetic recording medium and subsequent application of a magnetic field of 1,500 Oe in the opposite direction. Preferably, the water content of the ferromagnetic particles is 0.01 to 2% by weight, however, it is preferred to optimize the water content of the ferromagnetic particles according to the kind of binder. Preferably, the pH of the ferromagnetic particles is optimized according to the binder to be used in combination therewith. The pH thereof is generally from 4 to 12, preferably from 6 to 10. If desired, the ferromagnetic particles may be surface-treated with Al, Si, P, or an oxide or other compound thereof. The amount of such treating agent is preferably from 0.1 to 10% by weight based on the weight of the ferromagnetic particles. This surface treatment is advantageous in that it reduces lubricant (e.g., a fatty acid) adsorption to 100 mg/$m^2$ or less. The ferromagnetic particles may contain a soluble inorganic ion, such as Na, Ca, Fe, Ni, or Sr. This does not substantially affect the properties of the ferromagnetic particles if the soluble inorganic ion content is up to 500 ppm. A low void content is preferred in the ferromagnetic particles used in the present invention. Preferably the void content is up to 20% by volume, more preferably up to 5% by volume. If acicular ferromagnetic particles are used in the magnetic layer, the aspect ratio thereof is preferably up to 12.

Any suitable nonmagnetic particles may be used in the nonmagnetic layer of the magnetic recording medium of the present invention. Preferably, the nonmagnetic particles are inorganic compounds, for example, metal oxides, metal carbonates, metal sulfates, metal nitrides, metal carbides and metal sulfides. Examples of such inorganic compounds include α-alumina having an α-alumina structure content of at least 90%, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron oxide, zinc oxide, calcium carbonate, calcium sulfate, barium sulfate and molybdenum disulfide. An inorganic compound may be used alone or more than one inorganic compound may be used in combination. Preferred inorganic compounds include titanium dioxide, zinc oxide, α-iron oxide and barium sulfate, with titanium dioxide being more preferred. The average particle sizes of the nonmagnetic particles are preferably from 0.005 to 2 μm, more preferably from 0.01 to 0.2 μm. It is, however, possible to use a combination of two or more kinds of nonmagnetic particles having different particle sizes if desired. Alternatively, one kind of nonmagnetic particles having a wide particle diameter distribution may be used. The tap density is generally from 0.05 to 2 g/ml, preferably from 0.2 to 1.5 g/ml. The water content is generally from 0.1 to 5% by weight, preferably from 0.2 to 3% by weight. The pH is generally from 2 to 11, preferably from 6 to 9. The specific surface area is generally from 1 to 100 $m^2/g$, preferably from 5 to 50 $m^2/g$, and more preferably from 7 to 40 $m^2/g$. The crystallite size is preferably from 0.01 to 2 μm. The oil absorption as measured with DBP is generally from 5 to 100 ml/100 g, preferably from 10 to 80 ml/100 g, and more preferably from 20 to 60 ml/100 g. The specific gravity is generally from 1 to 12, preferably from 3 to 6. The particle shape may be any suitable shape such as acicular, spherical, polyhedral, and plate-like shapes. The ignition loss is preferably 20% by weight or less.

It is preferred that the inorganic particles for use in the present invention have a Mohs' hardness of 4 or higher. The roughness factor of the surfaces of the nonmagnetic particles is preferably from 0.8 to 1.5, more preferably from 0.9 to 1.2. The stearic acid (SA) adsorption is preferably from 1 to 20 µmol/m², more preferably from 2 to 15 µmol/m². It is preferred that the nonmagnetic particles for the lower nonmagnetic layer have a heat of wetting by water in the range of from 200 to 600 erg/cm² at 25° C. A solvent which gives a heat of wetting in the above range can be used. The appropriate number of water molecules present on the surfaces at 100° to 400° C. is from 1 to 10 per 100 Å². The pH as measured in water at the isoelectric point is preferably from 3 to 6. Preferably, the nonmagnetic particles are surface-treated with $Al_2O_3$, $SiO_2$, $TiO_2$, $ZrO_2$, $SnO_2$, $Sb_2O_3$, or ZnO. Of these, $Al_2O_3$, $SiO_2$, $TiO_2$, and $ZrO_2$ are preferred in view of their dispersibility, with $Al_2O_3$, $SiO_2$, and $ZrO_2$ being more preferred. The foregoing may be used in combination or alone. The nonmagnetic particles may be treated with surface layer formed by co-deposition, if desired. The nonmagnetic particles may also be treated with a surface layer having a structure formed by first treating the nonmagnetic particles with alumina and then treating the resulting surface layer with silica. The nonmagnetic particles may be first surface treated with the silica and then the alumina. The surface treatment layer may be porous if desired, and in any event, a homogeneous and dense surface layer is preferred.

Specific examples of nonmagnetic particles that can be used in the present invention include UA5600 and UA5605 manufactured by Showa Denko K.K.; AKP-20, AKP-30, AKP-50, HIT-55, HIT-100, and ZA-G1 manufactured by Sumitomo Chemical Co., Ltd.; G5, G7, and S-1 manufactured by Nippon Chemical Industrial Co., Ltd.; TF-100, TF-120, TF-140, R516, DPN-250BX and modification of surface treatment thereof, and DBN-270BX manufactured by Toda Kogyo Co., Ltd.; TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680, and TY-50 manufactured by Ishihara Sangyo Kaisha Ltd.; ECT-52, STT-4D, STT-30D, STT-30, and STT-65C manufactured by Titan Kogyo K.K. T-1 manufactured by Mitsubishi Material Co., Ltd.; NS-O, NS-3Y, and NS-8Y manufactured by Nippon Shokubai Kagaku Kogyo Co., Ltd.; MT-100S, MT-100T, MT-150W, MT-500B, MT-600B, and MT-100F manufactured by Teika K.K.; FINEX-25, BF-1, BF-10, BF-20, BF-1L, and BF-10P manufactured by Sakai Chemical Industry Co., Ltd.; DEFIC-Y and DEFIC-R manufactured by Dowa Mining Co., Ltd.; and Y-LOP manufactured by Titan Kogyo K.K. and nonmagnetic particles obtained by calcining it.

Especially preferred nonmagnetic particles are titanium dioxide particles. Hence, a suitable method for production of titanium dioxide is described in detail. A sulfuric acid process or a chlorine process are mainly used to produce titanium dioxide. In the sulfuric acid process, raw ore of ilmenite is leached with sulfuric acid to extract Ti, Fe, etc. as sulfates. The iron sulfate is removed by crystallization, and the remaining titanyl sulfate solution is purified by filtration and then subjected to hydrolysis with heating to thereby precipitate hydrous titanium oxide. This precipitate is separated by filtration and then washed to remove impurities. Calcination of the resulting precipitate at 80° to 1,000° C. after addition of a particle size regulator or the like provides crude titanium oxide. The titanium oxide is in rutile form or anatase form according to the nucleating agent added during hydrolysis. The crude titanium oxide is ground, sieved, and subjected to, e.g., surface treatment, to thereby prepare a titanium dioxide product. In the chlorine process, natural or synthetic rutile is used as the raw ore. The ore is chlorinated under high-temperature reducing conditions to convert the Ti to $TiCl_4$ and the Fe to $FeCl_2$, and the iron chloride is solidified by cooling and separated from the liquid $TiCl_4$. The crude $TiCl_4$ obtained is purified by rectification and a nucleating agent is added thereto. This crude $TiCl_4$ is instantaneously reacted with oxygen at a temperature of 1,000° C. or higher to obtain crude titanium oxide. The same finishing technique as in the sulfuric acid process is employed to impact pigmenting properties to the crude titanium oxide prepared by the above oxidative decomposition step.

The titanium oxide may be surface treated as follows. The titanium oxide is dry-ground, and water and a dispersant are then added thereto. The resulting slurry is subjected to wet grinding, followed by centrifugal separation to separate coarse particles. The resulting fine particle slurry is then transferred to a surface treatment tank, where surface treatment with a metal hydroxide is performed. First, an aqueous solution of a predetermined amount of any suitable salt such as a salt of Al, Si, Ti, Zr, Sb, Sn or Zn, is added to the fine particle slurry and an acid or alkali material is added to neutralize the resulting slurry, to thereby form a hydrous oxide and to cover the surfaces of the titanium oxide particles with the oxide. Water-soluble salts formed as by-products are removed by decantation, filtration and washing. The fine particle slurry is subjected to final pH adjustment, filtration and washing with pure water. The resulting cake is dried with a spray dryer or hand dryer. Finally, the dry particles are ground with a jet mill to produce titanium oxide particles which are suitable for use in the present invention. Rather than a wet surface treatment process, the surface treatment can be conducted by passing $AlCl_3$ and $SiCl_4$ vapors through titanium oxide particles and then passing water vapor through the titanium oxide particles to treat the particle surfaces with Al and Si.

With respect to processes for the production of nonmagnetic particles, reference may be made to *Characterization of Powder Surfaces*, published by Academic Press.

Carbon black may be incorporated into the lower nonmagnetic layer in addition to the nonmagnetic particles whereby the known effect of reducing $R_s$ (surface resistivity) can be produced. The carbon black may be any suitable carbon black such as furnace black for rubbers, thermal black for rubbers, coloring black, acetylene black, or the like. The specific surface area of the carbon black is generally from 100 to 500 m²/g, preferably from 150 to 400 m²/g, and the DBP oil absorption thereof is generally from 20 to 400 ml/100 g, preferably from 30 to 200 ml/100 g. The particle diameter is generally from 5 to 80 mµ, preferably from 10 to 50 mµ, and more preferably from 10 to 40 mµ. It is preferred that the carbon black have a pH of 2 to 10, a water content of 0 1 to 10% and a tap density of 0.1 to 1 g/ml. Specific examples of carbon blacks usable in the present invention include BLACKPEARLS 2000, 1300, 1000, 900, 800, 880, 700, and VULCAN XC-72 manufactured by Cabot Co., Ltd.; #3050B, #3150B, #3250B, #3750B, #3950B, #950, #650B, #970B, #850B, and MA-600 manufactured by Mitsubishi Kasei Corporation; CONDUCTEX SC, RAVEN 8800, 8000, 7000, 5750, 5250, 3500, 2100, 2000, 1800, 1500, 1255, and 1250 manufactured by Columbian Carbon Co., Ltd.; and Ketjen Black EC manufactured by Akzo Corp. (Lion Akzo Co., Ltd.).

Carbon black may be surface-treated with a dispersant or other agent or grafted with a resin. Carbon black whose surfaces have been partly graphitized may also be used in the present invention. Further, the carbon black may be dispersed in a binder before being added to a coating fluid for application to a support. Carbon black can be present in the lower nonmagnetic layer in an amount up to 50% by weight based on the weight of inorganic particles present in the lower nonmagnetic layer, and up to 40% by weight based on the total weight of the lower nonmagnetic layer. Carbon black may be used alone or in combination. With respect to carbon black usable in the present invention, reference may be made to, for example, *Carbon Black Binran (Carbon Black Handbook)*, edited by Carbon Black Association, Japan.

Organic particles suitable for use as the nonmagnetic particles that can be used in the present invention include acrylic-styrene resin particles, benzoguanamine resin particles, melamine resin particles, phthalocyanine pigments, polyolefin resin particles, polyester resin particles, polyamide resin particles, polyimide resin particles, and poly(ethylene fluoride) resin particles. For producing these organic particles, such techniques described in JP-A-62-18564 and JP-A-60-255827 can be used. It should be noted that although an undercoating layer is provided in conventional magnetic recording media, such undercoating layer, which has a thickness of 0.5 μm or less, improves adhesion between the support and the magnetic or other layer and is different from the lower nonmagnetic layer in the present invention. In the present invention, a conventional undercoating layer may be provided in order to improve adhesion between the lower nonmagnetic layer and the support.

Conventional binders, lubricants, dispersants, additives, solvents, and dispersing techniques used in magnetic layers of conventional magnetic recording medium can be used in the lower nonmagnetic layer of the present invention. Conventional amounts and kinds of binders and conventional amounts and kinds of additives and dispersants can be used in the lower magnetic layer of the magnetic recording medium of the present invention. Such a nonmagnetic intermediate layer has a thickness of 0.2 to 5 μm, preferably 1 to 3 μm.

The nonmagnetic layer according to the present invention comprises a nonmagnetic particle as a main component. So far as the effects of the present invention can be exerted, the nonmagnetic layer according to the present invention may comprise a small amount of a magnetic material. The amount of such a magnetic material to be used is as small as 20% by weight based on the weight of the nonmagnetic particle. If the amount of the magnetic material exceeds 20% by weight, the effects of the present invention are lost.

Any suitable binder may be used in the nonmagnetic and magnetic layers in the present invention, such as a conventional thermoplastic resin, thermosetting resin, or reactive resin, or a mixture thereof. The thermoplastic resin preferably has a glass transition temperature of −100° to 150° C., a number-average molecular weight of 1,000 to 200,000, more preferably 10,000 to 100,000, and a polymerization degree of about 50 to 1,000. Examples of suitable thermoplastic resins include: polymers or copolymers containing a structural unit derived from vinyl chloride, vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, a vinyl ether; polyurethane resins; and various rubber-type resins. Examples of suitable thermosetting or reactive resins include phenolic resins, epoxy resins, thermosetting polyurethane resins, urea resins, melamine resins, alkyd resins, reactive acrylic resins, formaldehyde resins, silicone resins, epoxy-polyamide resins, mixtures of a polyester resin and an isocyanate prepolymer, mixtures of a polyester polyol and a polyisocyanate, and mixtures of a polyurethane and a polyisocyanate.

These resins are described in detail in *Plastic Handbook* published by Asakura Shoten, Japan. A conventional electron beam-curing type resin may be used as a binder for the nonmagnetic layer or the magnetic layer. Examples of resins and the production process therefor are described in detail in JP-A-62-256219. The above-mentioned resins can be used alone or in combination. Preferred combinations of resins for use in the invention include combinations of a polyurethane resin with one or more of the following vinyl chloride resins, vinyl chloride-vinyl acetate resins, vinyl chloride-vinyl acetate-vinyl alcohol resins, and vinyl chloride-vinyl acetate-maleic anhydride copolymers, and combinations of the foregoing with a polyisocyanate.

The polyurethane resins suitable for use as a binder in accordance with the invention may be any suitable polyurethane, such as polyester polyurethane, polyether polyurethane, polyether polyester polyurethane, polycarbonate polyurethane, polyester polycarbonate polyurethane, or polycaprolactone polyurethane. In order to improve dispersibility and durability of such resins, they preferably include at least one polar group selected from —COOM, —SO$_3$M, —OSO$_3$M, —P=O(OM)$_2$, —O—P=O(OM)$_2$ (where M is hydrogen atom or an alkali metal salt group), —OH, —NR$_2$, —N$^+$R$_3$ (R represents a hydrocarbon group), an epoxy group, —SH, —CN, and the like. The polar group or groups may be incorporated into the resin by copolymerization or addition reaction. The amount of such polar group(s) is generally from $10^{-1}$ to $10^{-8}$ mol/g, preferably from $10^{-2}$ to $10^{-6}$ mol/g.

Examples of suitable binders that can be used in the present invention include VAGH, VYHH, VMCH, VAGF, VAGD, VROH, VYES, VYNC, VMCC, XYHL, XYSG, PKHH, PKHJ, PKHC, and PKFE manufactured by Union Carbide Co., Ltd.; MPR-TA, MPR-TA5, MPR-TAL, MPR-TSN, MPR-TMF, MPR-TS, MPR-TM, and MPR-TAO manufactured by Nisshin Chemical Industry Co., Ltd.; 1000W, DX80, DX81, DX82, DX83, and 100FD manufactured by Denki Kagaku Kogyo K.K.; MR-105, MR110, MR100, and 400X-110A manufactured by Nippon Zeon Co., Ltd.; Nippollan N2301, N2302, and N2304 manufactured by Nippon Polyurethane Co., Ltd.; Pandex T-5105, T-R3080, T-5201, Burnock D-400, D-210-80, Crisvon 6109, and 7209 manufactured by Dainippon Ink & Chemicals, Inc.; Vylon UR8200, UR8300, UR8600, UR5500, UR4300, RV530, and RV280 manufactured by Toyobo Co., Ltd.; Daipheramine 4020, 5020, 5100, 5300, 9020, 9022, and 7020 manufactured by Dainichiseika Colour & Chemicals Mfg. Co., Ltd.; MX5004 manufactured by Mitsubishi Kasei Corporation; Sunprene SP-150, TIM-3003, and TIM-3005 manufactured by Sanyo Chemical Industries, Co., Ltd.; and Salan F310 and F210 manufactured by Asahi Chemical Industry Co., Ltd.

The amount of the binder present in the nonmagnetic and magnetic layers in the present invention is from 5 to 50% by weight, preferably from 10 to 30% by weight, based on the weight of the ferromagnetic particles. If the resin is a vinyl chloride resin, it is preferably present in an amount of 5 to 30% by weight in combination with 2 to 20% by weight of a polyurethane resin and 2 to 20% by weight of a polyisocyanate.

If a polyurethane is used as the binder in the magnetic layer in the present invention, the resin preferably has a glass transition temperature of −50° to 100° C., an elongation at break of 100 to 2,000%, a stress at break of 0.05 to 10 kg/cm$^2$, and a yield point of 0.05 to 10 kg/cm$^2$.

The magnetic recording medium of the present invention, as described above, has two or more layers. If desired, the nonmagnetic layer, lower magnetic layer, upper magnetic layer, and other magnetic layer(s) can include differing amounts of binder with regard to each other, and the proportion of vinyl chloride resin, polyurethane resin, polyisocyanate, or other resin in the binder can be varied among the various layers. Moreover, the molecular weight, polar group amount, the above-mentioned resin physical properties, etc. of each resin contained in each layer can be varied. Conventional techniques for forming multilayered magnetic layers may be employed. With regard to varying binder amount, it has been discovered that increasing the amount of binder in the upper magnetic layer diminishes marring of the magnetic layer surface, while increasing the binder amount in a magnetic layer other than the upper magnetic layer or in the nonmagnetic layer improves pliability and improves head touching.

Examples of polyisocyanate suitable for use in the binder of the present invention include tolylene diisocyanate, 4,4'-diphenylmethane diisocyanate, hexamethylene diisocyanate, xylylene diisocyanate, naphthylene 1,5-diisocyanate, o-toluidine diisocyanate, isophorone diisocyanate, triphenylmethane triisocyanate, products of the reactions of the above-mentioned, isocyanates with polyalcohols, and polyisocyanates formed through condensation of isocyanates. Suitable isocyanates for use in the present invention are commercially available under the trade names of: Coronate L, Coronate HL, Coronate 2030, Coronate 2031, Millionate MR, and Millionate MTL manufactured by Nippon Polyurethane Co., Ltd.; Takenate D-102, Takenate D-110N, Takenate D-200, and Takenate D-202 manufactured by Takeda Chemical Industries, Ltd.; and Desmodure L, Desmodure IL, Desmodure N, and Desmodure HL manufactured by Sumitomo Bayer Co., Ltd. A polyisocyanate may be used alone or in combinations of two or more polyisocyanates in the magnetic and nonmagnetic layers in order to take advantage of a difference in curing reactivity between the polyisocyonates.

As in the nonmagnetic layer, carbon black may be used in the magnetic layer in the present invention for purposes which will be discussed below. The carbon black may be, for example, furnace black for rubbers, thermal black for rubbers, coloring black, acetylene black, or the like. Preferably, carbon black used in the magnetic layer has a specific surface area of 5 to 500 m$^2$/g, a DBP absorption of 10 to 400 ml/100 g, an average particle diameter of 5 to 300 mμ, a pH of 2 to 10, a water content of 0.1 to 10% by weight, and a tap density of 0.1 to 1 g/ml. Examples of suitable carbon black usable in the magnetic layer of the present invention include BLACKPEARLS 2000, 1300, 1000, 900, 800, 700, and VULCAN XC-72 manufactured by Cabot Co., Ltd.; #80, #60, #55, #50, and #35 manufactured by Asahi Carbon Co., Ltd.; #2400B, #2300, #900, #1000, #30, #40, and #10B manufactured by Mitsubishi Kasei Corporation; and CONDUCTEX SC, RAVEN 150, 50, 40, and 15 manufactured by Columbian Carbon Co., Ltd.

The carbon black may be surface-treated with a dispersant or other agent or grafted with a resin. Carbon black whose surfaces have been partly graphitized may also be used. Before carbon black is added to a magnetic coating composition, it may be in advance dispersed with binders. Carbon black may be used alone or in combination. Preferably, the carbon black is present in the magnetic layer in an amount from 0.1 to 30% by weight based on the weight of the ferromagnetic particles. The carbon black in the magnetic layer functions to prevent static buildup in the layer; to reduce the coefficient of friction of the layer; as a light screen for the layer; and to improve the strength of the layer. The kind of carbon black used in the present invention will vary the foregoing effects and the degree of the foregoing effects. If desired, a particular kind, amount or combination of carbon black may be used in an upper magnetic layer and a different kind, amount or combination of carbon black may be used in a lower magnetic layer in view of the above-described properties, and other properties including particle size, oil absorption, electrical conductivity, and pH. With respect to carbon blacks usable in the magnetic layer in the present invention, reference may be made to, for example, *Carbon Black Binran* (*Carbon Black Handbook*) edited by Carbon Black Association.

Any suitable abrasive material may be used in the present invention. Preferably, materials having a Mohs' hardness of at least 6 are used either alone or in combination. Examples of suitable abrasive materials include α-alumina having an α-conversion of at least 90%, β-alumina, silicon carbide, chromium oxide, cerium oxide, α-iron oxide, corundum, artificial diamond, silicon nitride, silicon carbide, titanium carbide, titanium oxide, silicon dioxide and boron nitride. A composite of two or more of abrasive materials, one abrasive being obtained by surface treatment with another abrasive, may also be used. The abrasive materials may contain other compounds or elements, provided that the abrasive content is at least 90% by weight. Preferably, the abrasive material has particle sizes of 0.01 to 2 μm. If desired, abrasive materials having different particle sizes may be used in combination, or a single abrasive material having a wide particle diameter distribution may be used. Preferably, the abrasive material has a tap density of 0.3 to 2 g/ml, a water content of 0.1 to 5% by weight, a pH of 2 to 11, and a specific surface area ($S_{BET}$) of 1 to 30 m$^2$/g.

The abrasive material may have any suitable particle shape of the following: acicular, spherical, and dice-like shapes. A particle shape having a sharp corner as part of its contour is preferred because abrasive materials of such a shape have high abrasive properties. Examples of suitable abrasive materials that can be used in the present invention include: AKP-20, AKP-30, AKP-50, HIT-50, and HIT-100 manufactured by Sumitomo Chemical Co., Ltd.; G5, G7, and S-1 manufactured by Nippon Chemical Industrial Co., Ltd.; and TF-100 and TF-140 manufactured by Toda Kogyo Co., Ltd. If desired, a particuluar kind, amount or combination of abrasive materials may be used in the magnetic layer (upper and lower layers) and a different kind, amount or combination of abrasive materials may be used in the nonmagnetic layer. The abrasive material may be dispersed in a binder before being added to a magnetic coating fluid. Preferably, the number of abrasive material particles present on the magnetic layer surface and on the magnetic layer edges in the magnetic recording medium of the present invention is 5 abrasives per 100 μm$^2$ or more.

Various additives may be used in the present invention such as additives having a lubricating effect, antistatic effect, dispersing effect, plasticizing effect, and the like. Examples of suitable additives include molybdenum disulfide, tungsten disulfide, graphite, boron nitride, graphite fluoride, silicone oil, silicones having a polar group, fatty acid-modified silicones, fluorinated silicones, fluorinated alcohols, fluorinated esters, polyolefins, polyglycols, esters of alkylphosphoric acids and alkali metal salts thereof, esters of alkylsulfuric acids and alkali metal salts thereof, poly(phenyl ether)s, esters of fluoroalkylsulfuric acids and alkali metal salts thereof, monobasic fatty acids having 10 to 24 carbon atoms (which may have an unsaturated bond or be branched) and metal (Li, Na, K, Cu, etc.) salts thereof, mono-, di-, tri-, tetra-, penta-, and hexahydric alcohols having 12 to 22 carbon atoms (which may have an unsaturated bond or be branched), alkoxyalcohols having 12 to 22 carbon atoms, mono-, di-, or tri(fatty acid) esters including a monobasic fatty acid having 10 to 24 carbon atoms (which may have an unsaturated bond or be branched) and one of a mono-, di-, tri-, tetra-, penta-, and hexahydric alcohol having 2 to 12 carbon atoms (which may have an unsaturated bond or be branched), fatty acid esters of monoalkyl ethers of alkylene oxide polymers, fatty acid amides having 8 to 22 carbon atoms, and aliphatic amines having 8 to 22 carbon atoms.

Specific examples of these compounds include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol. In addition, there can be used nonionic surfactants, such as alkylene oxides, glycerines, glycidols, and alkylphenol ethylene oxide adducts; cationic surfactants, such as cyclic amines, ester amides, quaternary ammonium salts, hydantoin derivatives, heterocyclic compounds, and phosphonium or sulfonium compounds; anionic surfactants containing acid groups, such as carboxylic acid, sulfonic acid, phosphoric acid, sulfate and phosphate groups; and amphoteric surfactants, such as amino acids, aminosulfonic acids, esters of sulfuric or phosphoric acid with amino-alcohols, and alkylbetaines.

Suitable surfactants for use in the present invention are described in detail in *Kaimen Kasseizai Binran* (*Surfactant Handbook*) (published by Sangyo Tosho K.K., Japan). The above discussed additives, including lubricants and antistatic agents, need not be 100% pure, and may contain impurities such as isomers, unreacted raw materials, by-products, decomposition products, oxidation products, etc. Preferably, the impurities content is up to 30% by weight, more preferably up to 10% by weight.

If desired one kind or amount of lubricant or surfactant may be used in the magnetic layer and a different kind or amount of the same may be used in the nonmagnetic layer. For example, a fatty acid having a certain melting point may be used in the nonmagnetic layer and a different fatty acid having a different melting point may be used in the magnetic layer to control migration to the surface. Similarly, an ester having a certain boiling point or polarity may be used in the nonmagnetic layer and an ester having a different boiling point or polarity may be used in the magnetic layer to also control migration to the surface. A certain amount of a surfactant may be used in the nonmagnetic layer and a different amount of surfactant may be used in the magnetic layer to improve coating stability; also, a relatively larger amount of a lubricant may be used in the nonmagnetic layer compared to the magnetic layer to improve lubricating effect. It is a matter of course that the manners of using lubricants or surfactants are not limited to these examples.

Part or all of the additives used in the present invention may be added at any step in the coating fluid preparation process. For example, such additives can be mixed with ferromagnetic particles prior to kneading steps; can be added during the kneading of ferromagnetic particles with a binder and a solvent; can be added during dispersing steps; can be added after dispersion; or can be added to a coating solution immediately before coating. Part or all of the additives, depending upon a desired result, may be coated by simultaneous or successive coating after applying a magnetic layer. A lubricant may be applied on the magnetic layer surface after calendering or slitting thereof.

Examples of suitable lubricant products that can be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, Castor oil-cured fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, Butyl stearate, Butyl laurate, and Erucic acid manufactured by Nippon Oil & Fats Co., Ltd.; oleic acid manufactured by Kanto Chemical Co., Ltd.; FAL-205 and FAL-123 manufactured by Takemoto Yushi Co., Ltd.; Enujerub LO, Enujerub IPM, and Sansosyzer E4043 manufactured by Shin Nihon Rika Co., Ltd.; TA-3, KF-96, KF-96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 manufactured by Shin-Etsu Chemical Co., Ltd.; Armide P, Armide C, and Armoslip CP manufactured by Lion Armer Co., Ltd.; Duomine TDO manufactured by Lion Fat and Oil Co., Ltd.; BA-41G manufactured by Nisshin Oil Mills Co., Ltd.; and Profan 2012E, Newpole PE61, Ionet MS-400, Ionet MO-200, Ionet DL-200, Ionet DS-300, Ionet DS-1000, and Ionet DO-200 manufactured by Sanyo Chemical Industries, Ltd.

Examples of suitable organic solvents that can be used in the present invention include: ketones, such as acetone, methyl ethyl ketone, methyl isobutyl ketone, diisobutyl ketone, cyclohexanone, isophorone, and tetrahydrofuran; alcohols, such as methanol, ethanol, propanol, butanol, isobutyl alcohol, isopropyl alcohol, and methylcyclohexanol; esters, such as methyl acetate, butyl acetate, isobutyl acetate, isopropyl acetate, ethyl lactate, and glycol acetate; glycol ethers, such as glycol dimethyl ethers, glycol monoethyl ethers, and dioxane; aromatic hydrocarbons, such as benzene, toluene, xylene, cresol, and chlorobenzene; chlorinated hydrocarbons, such as methylene chloride, ethylene chloride, carbon tetrachloride, chloroform, ethylene chlorohydrin, and dichlorobenzene; and other compounds, such as N,N-dimethylformamide and hexane. These solvents may be used in any suitable amount.

Organic solvents suitable for use in the invention need not be 100% pure, and may contain impurities such as isomers, unreacted raw materials, by-products, decomposition products, oxidation products, water, etc. Preferably, the impurities content is up to 30% by weight, more preferably up to 10% be weight. Preferably, the organic solvents used for the magnetic layer in the present invention are the same as the organic solvents used for the nonmagnetic layer. Different solvent amounts may be used for the magnetic layer and the nonmagnetic layer. Preferably, solvents having higher surface tensions (e.g., cyclohexanone and dioxane) are used for the nonmagnetic layer in order to enhance the coating stability. Specifically, the arithmetic mean for surface tensions of the upper layer solvents should be not higher than that for surface tensions of the lower layer solvents. Solvents which are polar to some degree are preferred in order to improve dispersibility, and a preferred solvent composition is one at least 50% of which consists of one or more solvents having a dielectric constant of at least 15. The preferred range of solubility parameter is from 8 to 11.

The thickness of each layer of the magnetic recording medium according to the present invention is as follows. The thickness of the nonmagnetic flexible support is generally from 1 to 100 μm, preferably from 4 to 80 μm. The total thickness of the magnetic layer and the nonmagnetic layer is from 1/100 to 2 times the thickness of the nonmagnetic flexible support. An undercoating layer may be provided between the nonmagnetic flexible support and the nonmagnetic layer in order to improve adhesion. The thickness of this undercoating layer is generally from 0.01 to 2 μm, preferably from 0.02 to 0.5 μm. Further, a back coating layer may be provided on the nonmagnetic support on the side opposite to the magnetic layer. The thickness of this back coating layer is generally from 0.1 to 2 μm, preferably from 0.3 to 1.0 μm. Such an undercoating layer and a back coating layer may be conventional ones.

The nonmagnetic flexible support for use in the present invention may be any suitable conventional film. Examples of suitable film material include: polyesters, such as polyethylene terephthalate and polyethylene naphthalate; polyolefins; cellulose triacetate; polycarbonates; polyamides; polyimides; polyamideimides; polysulfone; aramids; and aromatic polyamides. When a thin support of 10 μm or less is used, preferred is a high intensity support such as polyethylene naphthalate and polyamide. The support may be subjected to corona discharge treatment, plasma treatment, adhesion-promoting treatment, heat treatment, dust-removing treatment. In order to attain the object of the present invention, it is necessary to employ a nonmagnetic flexible support having a central line average surface roughness according to JIS B 0601 (cut-off value, 0.25 mm) of 0.03 μm or less, preferably 0.02 μm or less, more preferably 0.01 μm or less.

In addition to the requirement of low central mean surface roughness, the nonmagnetic support is preferably free from projections which are 1 μm or more. Surface roughness of the support can be controlled by changing the size and amount of filler incorporated into the support if required and necessary. Any suitable filler may be used in the present invention. Examples of preferred fillers include oxides or carbonates of Ca, Si, and Ti and fine organic powders, such as acrylic powder. Preferably, the nonmagnetic support of the present invention has an F-5 (i.e. load at a 5% elongation) value in the tape running direction of 5 to 50 kg/mm$^2$ and an F-5 value in the tape width direction of 3 to 30 kg/mm$^2$. Although the F-5 value in the tape length direction generally is higher than the F-5 value in the tape width direction, this does not apply when it is desired that the width-direction strength be enhanced. Thermal shrinkage of the support in the tape running direction and in the tape width direction are both preferably 3% or less, more preferably 1.5% or less, at 100° C. and 30 minutes, and are preferably 1% or less, more preferably 0.5% or less, at 80° C. and 30 minutes. Break strength in both the running (longitudinal) and width directions is preferably from 5 to 100 kg/mm$^2$, and the modulus in both the running and width directions is preferably from 100 to 2,000 kg/mm$^2$.

The process for preparing a magnetic coating fluid to be used for producing the magnetic recording medium of the present invention includes at least a kneading step and a dispersing step, and may further include a mixing step that may be conducted, if needed, before and after the kneading and dispersing steps. Each step may include two or more stages. Each of the materials for use in the present invention, including ferromagnetic particles, binder, carbon black, abrasive material, antistatic agent, lubricant, and solvent, may be added in any step either at the beginning of or during the step. Further, the individual raw materials may be added in portions in two or more steps. For example, portions of a polyurethane may be in each of the kneading step, the dispersing step, and the mixing step of adjusting the viscosity of the resulting dispersions.

Conventional manufacturing techniques can be used in order to prepare magnetic recording medium in accordance with the present invention. However, use of a kneading machine having high kneading power, such as a continuous kneader or a pressure kneader, in the kneading step produces a magnetic recording medium in accordance with the present invention and having a high residual magnetic flux density ($B_r$). In a continuous kneader or a pressure kneader, ferromagnetic particles may be kneaded with all or part (preferably at least 30% by weight) of the binder, the amount of binder being from 15 to 500 parts by weight per 100 parts by weight of the ferromagnetic particles. A suitable kneading treatment is described in JP-A-1-106338 and JP-A-64-79274. The use of a dispersion medium having a high specific gravity is preferred when preparing a coating fluid for the lower nonmagnetic layer. A preferred dispersion medium is zirconia beads.

Exemplary coating apparatuses and methods for producing multilayered magnetic recording media in accordance with the present invention are as follows:

1. A lower layer may first be applied with a coating apparatus commonly used for applying magnetic coating fluid, e.g., a gravure coating apparatus, a roll coating apparatus, a blade coating apparatus, or an extrusion coating apparatus, and an upper layer is then applied, while the lower layer is in a wet state, by means of a support-pressing extrusion coater, such as those disclosed in JP-B-1-46186, JP-A-60-238179, and JP-A-2-265672.

2. An upper layer and a lower layer may be applied almost simultaneously using a single coating head having therein two slits for coating fluids, such as those disclosed in JP-A-63-88080, JP-A-2-17971, and JP-A-2-265672.

3. An upper layer and a lower layer may be applied almost simultaneously with an extrusion coater equipped with a back-up roll, such as that disclosed in JP-A-2-174965.

Preferably, shearing is applied to a coating fluid for the magnetic layer in order to prevent the electromagnetic characteristics and other properties of the magnetic recording medium from being impaired by aggregation of magnetic particles. Preferably, shearing is applied to such a coating fluid while in a coating head by a method such as those disclosed in JP-A-62-95174 and JP-A-1-236968. The viscosity of each coating fluid should be in the range as specified in JP-A-3-8471.

More preferably, at least two of the nonmagnetic layer and the first and second magnetic layers of the present invention are formed by a wet-on-wet coating process according to U.S. Pat. No. 4,844,946.

In order to provide a magnetic recording medium according to the present invention particularly having SFD of 0.3 or less, a strong orientation is required. A solenoid having 1,000 G or more and a cobalt magnet having 2,000 G or more are used in combination with the same pole opposing to each other. Further, a proper drying step is preferably provided before orientation so that the orientation of the magnetic recording medium can reach its highest value. However, if the present invention is applied as a disc medium, an orientation process is needed such that the orientation is randomized. Further, in order to alter the orientation direction of the first and second magnetic layers, the orientation direction doesn't necessarily need to be coatingwise on the plane but may be vertical or crosswise (widthwise). The uppermost layer comprising a hexagonal ferrite magnetic material can be vertically oriented with different poles of magnets opposing to each other to enhance the squareness ratio (SQ) in the vertical direction on the plane.

Plastic rolls having heat resistance are preferably used as calendering rolls. The plastic may be epoxy, polyimide, polyamide, or poly(imide-amide). Metal rolls alone can also be used for the calendering. The calendering temperature is preferably 70° C. or higher, more preferably 80° C. or higher. The linear pressure during calendering is preferably 200 kg/cm or higher, more preferably 300 kg/cm or higher.

The magnetic recording medium of the present invention preferably has the following properties: the coefficients of friction of the magnetic layer surface and the opposite side surface with SUS420J are preferably 0.5 or less, more preferably 0.3 or less; the surface resistivity thereof is from $10^4$ to $10^{12}$ Ω/sq; the modulus at 0.5% elongation of the magnetic layer is from 100 to 2,000 kg/mm$^2$ in both the running and width directions; the break strength thereof is from 1 to 30 kg/cm$^2$; the modulus of the magnetic recording medium is from 100 to 1,500 kg/mm$^2$ in both running and width directions; the residual elongation thereof is 0.5% or less; and the thermal shrinkage thereof at any temperature not higher than 100° C. is preferably 1% or less, more preferably 0.5% or less, and most preferably 0.1% or less.

The glass transition temperature (the temperature at which the loss modulus in a dynamic viscoelasticity measurement at 110 Hz becomes maximum) of the magnetic layer is preferably from 50° to 120° C., while that of the lower nonmagnetic layer is preferably from 0° to 100° C. The loss modulus of the magnetic recording medium is preferably in the range of from $1 \times 10^8$ to $8 \times 10^9$ dyne/cm$^2$, and the loss tangent is preferably 0.2 or less. Too large loss tangents are disadvantageous because sticking problems result.

The residual solvent content in the magnetic layer is preferably 100 mg/m$^2$ or less, more preferably 10 mg/m$^2$ or less. Preferably, the residual solvent content in the second magnetic layer is lower than that in the first magnetic layer.

The void content in the nonmagnetic layer and the void content in the magnetic layer each is preferably 30% by volume or less, more preferably 20% by volume or less. Although a lower void content is desirable for attaining higher output, a certain degree of void content is preferred in some applications of the magnetic recording media of the present invention. For example, a magnetic recording medium for data recording which is subjected to repeated running operations preferably includes a relatively high void content in order to achieve better running durability.

The central line surface roughness $R_a$ of the magnetic layer is generally 0.006 μm or less. It is preferable that the RMS (average root-mean-square) surface roughness, $R_{RMS}$, as determined by AFM (atomic force microscope) examination is preferably from 2 nm to 15 nm.

The nonmagnetic layer and the magnetic layer can each have different physical properties depending upon how the media will be used. For example, the magnetic layer may have an increased modulus relative to the nonmagnetic layer to improve running durability and, at the same time, the nonmagnetic layer may have a lower modulus relative to the magnetic layer to improve head contact of the magnetic recording medium.

The present invention will be explained below in more detail by reference to the following examples, but the invention is not construed as being limited thereto. In the examples, all parts are by weight.

EXAMPLES

| (1) Nonmagnetic Layer Coating Solution X: | |
|---|---|
| Nonmagnetic particles, TiO$_2$ | 80 parts |
|   Crystal system | rutile |
|   Average primary particle diameter | 0.035 μm |
|   BET specific surface area | 40 m$^2$/g |
|   pH | 7 |
|   TiO$_2$ content | 90% or higher |
|   DBP absorption | 27–38 ml/100 g |
|   Surface-treating agent | Al$_2$O$_3$ |
| Carbon black | 20 parts |
|   Average primary particle diameter | 16 mμ |
|   DBP absorption | 80 ml/100 g |
|   pH | 8.0 |
|   BET specific surface area | 250 m$^2$/g |
|   Volatile content | 1.5% by weight |
| Vinyl chloride copolymer | 12 parts |
|   Containing $1 \times 10^{-4}$ eq/g of —SO$_3$Na group | |
|   Polymerization degree | 300 |
| Polyester polyurethane resin | 5 parts |
|   Neopentyl glycol/caprolactonepolyol/MDI = 0.9/2.6/1 | |
|   Containing $1 \times 10^{-4}$ eq/g of —SO$_3$Na group | |
| Butyl stearate | 1 part |
| Stearic acid | 1 part |
| Methyl ethyl ketone | 100 parts |
| Cyclohexanone | 50 parts |
| Toluene | 50 parts |
| (2) First Magnetic Layer Coating Solution Y: | |
| Ferromagnetic metal fine particles | 100 parts |
|   Composition, Fe/Zn/Ni = 92/4/4 | |
|   H$_c$ | 1,600 Oe |
|   BET specific surface area | 54 m$^2$/g |
|   Crystallite size | 195 Å |
|   Surface-treating agent | Al$_2$O$_3$, SiO$_2$ |
|   Average particle size (major axis length) | 0.18 μm |
|   Aspect ratio | 10 |
|   σ$_s$ | 130 emu/g |
| Vinyl chloride copolymer | 12 parts |
|   Containing $1 \times 10^{-4}$ eq/g of —SO$_3$Na group | |
|   Polymerization degree | 300 |
| Polyester polyurethane resin | 3 parts |
|   Neopentyl glycol/caprolactonepolyol/MDI = 0.9/2.6/1 | |
|   Containing $1 \times 10^{-4}$ eq/g of —SO$_3$Na group | |
| α-Alumina (average particle size, 0.3 μm) | 2 parts |
| Carbon black | 0.5 part |
| (average particle size, 0.10 μm) | |
| Butyl stearate | 1 part |
| Stearic acid | 5 parts |
| Methyl ethyl ketone | 90 parts |
| Cyclohexanone | 30 parts |
| Toluene | 60 parts |
| Second Magnetic Layer Coating Solution Z: | |
| Hexagonal barium ferrite | 100 parts |
|   H$_c$ | 1,800 Oe |
|   BET specific surface area | 45 m$^2$/g |
|   Average particle size (plate length) | 0.05 μm |
|   Average plate thickness | 0.01 μm |
|   σ$_s$ | 60 emu/g |
|   Surface-treating agent | Al$_2$O$_3$, SiO$_2$ |
| Vinyl chloride copolymer | 12 parts |
|   Containing $1 \times 10^{-4}$ eq/g of —SO$_3$Na group | |
|   Polymerization degree | 300 |
| Polyester polyurethane resin | 3 parts |
|   Neopentyl glycol/caprolactonepolyol/MDI = 0.9/2.6/1 | |
|   Containing $1 \times 10^{-4}$ eq/g of —SO$_3$Na group | |
| α-Alumina (average particle size, 0.3 μm) | 2 parts |
| Carbon black | 5 parts |
| (average particle size, 0.015 μm) | |
| Butyl stearate | 1 part |

-continued

| Stearic acid | 2 parts |
| Methyl ethyl ketone | 90 parts |
| Cyclohexanone | 30 parts |
| Toluene | 60 parts |

With respect to each of the above three coating fluids, the ingredients were kneaded with a continuous kneader and then dispersed with a sand mill. A polyisocyanate was added to each of the resulting dispersions in an amount of 1 part for the nonmagnetic layer coating solution and in an amount of 3 parts for each of the second magnetic layer and first magnetic layer coating solutions. 40 parts of a methyl ethyl ketone/cyclohexanone solvent mixture (mixture ratio: 50/50 ) was added to each dispersion. The resulting dispersions were filtered with a filter having an average pore diameter of 1 μm to thereby prepare coating fluids for forming nonmagnetic layer coating solution X, and upper magnetic layer coating solutions Y and Z, respectively.

The evaluation methods of the following experiments are as follows.

Evaluation Methods a) SFD, Hc, Bm

These magnetic properties were measured at an Hm of 5 kOe by means of a vibrating sample magnetometer (available from Toei Kogyo Co., Ltd.).

The magnetic properties of the various magnetic layers can be determined by any of the following methods:

(1) The various magnetic layers are individually coated to a thickness of 3 μm, and then each measured for magnetic properties.

(2) The second magnetic layer is removed with an abrasive tape, and the hysteresis of the first magnetic layer is then measured. Accordingly, the magnetic properties of the second magnetic layer can be determined by the difference in the hysteresis loop between the whole layers and the second magnetic layer.

The thickness of the various layers were determined by an electron micrograph of a section of the magnetic recording medium.

b) Central line average surface roughness

The central line average surface roughness was measured at a cut off value of 0.08 mm by means of a three-dimensional surface roughness meter (available from Kosaka Laboratory Co., Ltd.).

c) Diameter and thickness of tabular magnetic grain

The specimen was photographed under a transmission type electron microscope. The short axis length and long axis length of the magnetic material was directly determined from the photograph. Alternatively, these values were determined by tracing the photograph by Type IBASS1 image analyzer available from Karl Zeiss Corp. The average grain diameter was determined by employing the two methods in proper combination.

d) Electro-magnetic conversion characteristics

A 7 MHz signal was recorded on the video tape with a 8-mm video deck FUJIX 8 available from Fuji Photo Film Co., Ltd. The signal thus recorded was then reproduced from the video tape. The 7 MHz and 2 MHz signal outputs were measured on an oscilloscope. As a reference there was used a 8-mm tape SAGP6-120 available from Fuji Photo Film Co., Ltd.

EXAMPLE 1

The nonmagnetic coating solution X was coated on a 7-μm thick polyethylene terephthalate support having a central line surface roughness of 0.004 μm to a dry thickness of 2.5 μm. This coating procedure was immediately followed by the simultaneous coating of the magnetic coating solution Y to a dry thickness of 0.3 μm. While the two layers were wet, the coated material was oriented with a cobalt magnet having a magnetic force of 3,000 G and a solenoid having a magnetic force of 1,500 G. The coated material thus oriented was then dried. The coated material was then calendered at a temperature of 90° C. through a 7-stage calender composed of a metallic roll. The coated material was then slit into 8-mm wide strips to prepare a 8-mm video tape. The sample obtained was A-3 set forth in Table 1.

Samples A-1, A-2 and A-4 were then prepared in the same manner as A-3 except that the hexagonal barium ferrite to be incorporated in the magnetic coating solution Z was replaced by a hexagonal ferrite whose coercive force distribution had been narrowed by altering the spinel phase thickness distribution, the kind and amount of substituent elements and the substitution site in the magnetic grains.

Sample A-5 was then prepared in the same manner as A-3 except that a cobalt magnet having 5,000 G was used. Sample A-6 was then prepared in the same manner as A-3 except that a cobalt magnet having 1,000 G was used.

Samples A-7 and A-8 were then prepared in the same manner as A-3 except that the coercive force of the hexagonal barium ferrite was altered, respectively.

Samples A-9 and A-10 were then prepared in the same manner as A-3 except that σs of the hexagonal barium ferrite was altered to 65 emu/g and 55 emu/g, respectively.

Samples A-11 and A-12 were then prepared in the same manner as A-3 except that the thickness of the upper magnetic layers were 0.1 μm and 1.0 μm, respectively.

Samples A-13 and A-14 were then prepared in the same manner as A-3 except that the central line surface roughness of the supports were 0.002 μm and 0.006 μm, respectively.

COMPARATIVE EXAMPLE 1

Sample B-1 was prepared in the same manner as A-3 except that Hc of the magnetic layer was 500 Oe.

Sample B-2 was prepared in the same manner as A-3 except that only the magnetic coating solution Z was coated to a thickness of 3.0 μm and the nonmagnetic coating solution X was not coated.

Sample B-3 was prepared in the same manner as A-3 except that a conventional hexagonal ferrite having a wide coercive force distribution was used.

Sample B-4 was prepared in the same manner as A-3 except that a support having a central line surface roughness of 0.01 μm was used.

TABLE 1

| Sample No. | Non-magnetic layer thickness (μm) | Magnetic layer SFD | Squareness ratio | Hc (Oe) | Bm (G) | Thickness (μm) | Br/Hc | Surface roughness (μm) | 7 MHz output (dB) |
|---|---|---|---|---|---|---|---|---|---|
| A-1 | 2.5 | 0.3 | 0.7 | 1800 | 1800 | 0.3 | 0.7 | 0.003 | 1.0 |
| A-2 | 2.5 | 0.2 | 0.7 | 1800 | 1800 | 0.3 | 0.7 | 0.003 | 1.2 |
| A-3 | 2.5 | 0.1 | 0.7 | 1800 | 1800 | 0.3 | 0.7 | 0.003 | 1.8 |
| A-4 | 2.5 | 0.05 | 0.7 | 1800 | 1800 | 0.3 | 0.7 | 0.003 | 2.5 |
| A-5 | 2.5 | 0.1 | 0.8 | 1800 | 1800 | 0.3 | 0.8 | 0.003 | 1.5 |
| A-6 | 2.5 | 0.1 | 0.6 | 1800 | 1800 | 0.3 | 0.6 | 0.003 | 2.0 |
| A-7 | 2.5 | 0.1 | 0.7 | 3000 | 1800 | 0.3 | 0.42 | 0.003 | 3.2 |
| A-8 | 2.5 | 0.1 | 0.7 | 1200 | 1800 | 0.3 | 1.05 | 0.003 | 1.2 |
| A-9 | 2.5 | 0.1 | 0.7 | 1800 | 2300 | 0.3 | 0.89 | 0.003 | 1.6 |
| A-10 | 2.5 | 0.1 | 0.7 | 1800 | 1500 | 0.3 | 0.58 | 0.003 | 1.9 |
| A-11 | 2.5 | 0.1 | 0.7 | 1800 | 1800 | 0.1 | 0.7 | 0.003 | 2.0 |
| A-12 | 2.5 | 0.1 | 0.7 | 1800 | 1800 | 1.0 | 0.7 | 0.003 | 1.0 |
| A-13 | 2.5 | 0.1 | 0.7 | 1800 | 1800 | 0.3 | 0.7 | 0.001 | 2.5 |
| A-14 | 2.5 | 0.1 | 0.7 | 1800 | 1800 | 0.3 | 0.7 | 0.005 | 1.2 |
| B-1 | 2.5 | 0.1 | 0.7 | 500 | 1800 | 0.3 | 2.52 | 0.003 | -2.5 |
| B-2 | — | 0.3 | 0.7 | 1800 | 1800 | 3.0 | 0.7 | 0.008 | -0.8 |
| B-3 | 2.5 | 0.5 | 0.7 | 1800 | 1800 | 3.0 | 0.7 | 0.003 | 0.2 |
| B-4 | 2.5 | 0.3 | 0.7 | 1800 | 1800 | 3.0 | 0.7 | 0.008 | -0.4 |

Table 1 shows that Samples A-1 to A-14 according to the present invention exhibit a remarkably improved 7 MHz output. On the other hand, Samples B-1 to B-4, which lack at least one of the constituent elements of the present invention, cannot provide a sufficient improvement in 7 MHz output.

EXAMPLE 2

Samples A-15 to A-28 were prepared in the same manner as in Example 1 except that the magnetic coating solution Y was coated to a dry thickness of 0.5 μm instead of the nonmagnetic coating solution X. The dry thickness of the magnetic coating solution Z thus coated is set forth in Table 2. Sample A-29 was then prepared in the same manner as A-17 except that the acicular ratio of the ferromagnetic metal particle contained in the magnetic coating solution Y was altered to 12 to enhance the orientation of the product.

Sample A-30 was prepared in the same manner as A-17 except that the ferromagnetic metal particle to be incorporated in the magnetic coating solution Y was replaced by a cobalt-modified iron oxide having an Hc of 800 Oe, a specific surface area of 45 m²/g as determined by BET method, a crystallite size of 200 Å, a grain size (size of longer axis) of 0.19 μm, an acicular ratio of 7 and σs of 80 emu/g which had been treated with surface treatments $Al_2O_3$ and $SiO_2$.

COMPARATIVE EXAMPLE 2

Sample B-5 was prepared in the same manner as A-17 except that Hc of the second magnetic layer was 500 Oe.

Sample B-6 was prepared in the same manner as A-17 except that only the magnetic coating solution Y was coated to a thickness of 3.5 μm and the nonmagnetic coating solution Z was not coated.

Sample B-7 was prepared in the same manner as A-17 except that the magnetic coating solution Y was coated to a dry thickness of 2.5 μm.

Samples B-8 and B-9 were prepared in the same manner as in Comparative Example 1 except that the magnetic coating solution Y was coated to a dry thickness of 0.5 μm instead of the nonmagnetic coating solution X. The thickness of the magnetic coating solution Z thus coated is set forth in Table 2.

TABLE 2

| Sample No. | First magnetic layer Squareness ratio | Hc (Oe) | Bm (G) | Thickness (μm) | Second magnetic layer SFD | Squareness ratio | Hc (Oe) | Bm (G) | Thickness (μm) | Br/Hc | Surface roughness (μm) | 7 MHz output (dB) | 2 MHz output (dB) |
|---|---|---|---|---|---|---|---|---|---|---|---|---|---|
| A-15 | 0.8 | 1600 | 3500 | 0.5 | 0.3 | 0.7 | 1800 | 1800 | 0.1 | 0.7 | 0.004 | 1.2 | 1.0 |
| A-16 | 0.8 | 1600 | 3500 | 0.5 | 0.2 | 0.7 | 1800 | 1800 | 0.1 | 0.7 | 0.004 | 1.5 | 1.1 |
| A-17 | 0.8 | 1600 | 3500 | 0.5 | 0.1 | 0.7 | 1800 | 1800 | 0.1 | 0.7 | 0.004 | 2.1 | 1.1 |
| A-18 | 0.8 | 1600 | 3500 | 0.5 | 0.05 | 0.7 | 1800 | 1800 | 0.1 | 0.7 | 0.004 | 2.7 | 1.2 |
| A-19 | 0.8 | 1600 | 3500 | 0.5 | 0.1 | 0.8 | 1800 | 1800 | 0.1 | 0.8 | 0.004 | 1.9 | 1.2 |
| A-20 | 0.8 | 1600 | 3500 | 0.5 | 0.1 | 0.6 | 1800 | 1800 | 0.1 | 0.6 | 0.004 | 2.3 | 1.0 |
| A-21 | 0.8 | 1600 | 3500 | 0.5 | 0.1 | 0.7 | 3000 | 1800 | 0.1 | 0.42 | 0.004 | 3.5 | 0.8 |
| A-22 | 0.8 | 1600 | 3500 | 0.5 | 0.1 | 0.7 | 1200 | 1800 | 0.1 | 1.05 | 0.004 | 1.5 | 1.3 |
| A-23 | 0.8 | 1600 | 3500 | 0.5 | 0.1 | 0.7 | 1800 | 2300 | 0.1 | 0.89 | 0.004 | 1.9 | 1.5 |
| A-24 | 0.8 | 1600 | 3500 | 0.5 | 0.1 | 0.7 | 1800 | 1500 | 0.1 | 0.58 | 0.004 | 2.2 | 0.9 |
| A-25 | 0.8 | 1600 | 3500 | 0.5 | 0.1 | 0.7 | 1800 | 1800 | 0.05 | 0.7 | 0.004 | 2.3 | 1.4 |
| A-26 | 0.8 | 1600 | 3500 | 0.5 | 0.1 | 0.7 | 1800 | 1800 | 0.4 | 0.7 | 0.004 | 1.7 | 0.8 |
| A-27 | 0.8 | 1600 | 3500 | 0.5 | 0.1 | 0.7 | 1800 | 1800 | 0.1 | 0.7 | 0.002 | 2.8 | 1.2 |
| A-28 | 0.8 | 1600 | 3500 | 0.5 | 0.1 | 0.7 | 1800 | 1800 | 0.1 | 0.7 | 0.006 | 1.5 | 1.0 |
| A-29 | 0.9 | 1600 | 3500 | 0.5 | 0.1 | 0.7 | 1800 | 1800 | 0.1 | 0.7 | 0.004 | 2.2 | 2.2 |

TABLE 2-continued

| Sample No. | First magnetic layer | | | | | Second magnetic layer | | | | | Surface roughness (μm) | 7 MHz output (dB) | 2 MHz output (dB) |
|---|---|---|---|---|---|---|---|---|---|---|---|---|---|
| | Squareness ratio | Hc (Oe) | Bm (G) | Thickness (μm) | SFD | Squareness ratio | Hc (Oe) | Bm (G) | Thickness (μm) | Br/Hc | | | |
| A-30 | 0.8 | 800 | 2000 | 0.5 | 0.3 | 0.7 | 1800 | 1800 | 0.1 | 0.7 | 0.004 | 2.0 | 2.4 |
| B-5 | 0.8 | 1600 | 3500 | 0.5 | 0.1 | 0.7 | 500 | 1800 | 0.1 | 2.52 | 0.004 | −2.1 | 0.8 |
| B-6 | 0.8 | 1600 | 3500 | 3.5 | — | — | — | — | — | — | 0.008 | −0.6 | 0.8 |
| B-7 | 0.8 | 1600 | 3500 | 3.0 | 0.3 | 0.7 | 1800 | 1800 | 0.1 | 0.7 | 0.003 | 0.2 | 0.6 |
| B-8 | 0.8 | 1600 | 3500 | 0.5 | 0.5 | 0.7 | 1800 | 1800 | 0.1 | 0.7 | 0.003 | 0.2 | 0.6 |
| B-9 | 0.8 | 1600 | 3500 | 0.5 | 0.3 | 0.7 | 1800 | 1800 | 0.1 | 0.7 | 0.008 | −0.4 | 0.4 |

Table 2 shows that Samples A-15 to A-30 according to the present invention provide a remarkable improvement in 7 MHz output and an improvement in 2 MHz output at the the magnetic coating solution Y and the support to a dry thickness of 2.5 μm by simultaneous multi-layer coating method. The dry thickness of the magnetic coating solution Z is set forth in Table 3.

TABLE 3

| Sample No. | Nonmagnetic layer thickness (μm) | First magnetic layer | | Second magnetic layer | | | Surface roughness (μm) | 7 MHz output | 2 MHz output |
|---|---|---|---|---|---|---|---|---|---|
| | | Coating | Thickness (μm) | Coating | Thickness (μm) | Br/Hc | | | |
| A-31 | 2.5 | A-15 | 0.5 | A-15 | 0.1 | 0.7 | 0.003 | 1.5 | 2.1 |
| A-32 | 2.5 | A-16 | 0.5 | A-16 | 0.1 | 0.7 | 0.003 | 1.8 | 1.1 |
| A-33 | 2.5 | A-17 | 0.5 | A-17 | 0.1 | 0.7 | 0.003 | 2.3 | 1.3 |
| A-34 | 2.5 | A-18 | 0.5 | A-18 | 0.1 | 0.7 | 0.003 | 2.9 | 1.2 |
| A-35 | 2.5 | A-19 | 0.5 | A-19 | 0.1 | 0.8 | 0.003 | 2.2 | 1.3 |
| A-36 | 2.5 | A-20 | 0.5 | A-20 | 0.1 | 0.6 | 0.003 | 2.5 | 1.1 |
| A-37 | 2.5 | A-21 | 0.5 | A-21 | 0.1 | 0.42 | 0.003 | 3.6 | 0.9 |
| A-38 | 2.5 | A-22 | 0.5 | A-22 | 0.1 | 1.05 | 0.003 | 1.8 | 1.3 |
| A-39 | 2.5 | A-23 | 0.5 | A-23 | 0.1 | 0.89 | 0.003 | 2.2 | 1.6 |
| A-40 | 2.5 | A-24 | 0.5 | A-24 | 0.1 | 0.58 | 0.003 | 2.4 | 1.0 |
| A-41 | 2.5 | A-25 | 0.5 | A-25 | 0.05 | 0.7 | 0.003 | 2.6 | 1.4 |
| A-42 | 2.5 | A-26 | 0.5 | A-26 | 0.4 | 0.7 | 0.003 | 2.2 | 1.3 |
| A-43 | 2.5 | A-27 | 0.5 | A-27 | 0.1 | 0.7 | 0.001 | 2.9 | 1.1 |
| A-44 | 2.5 | A-28 | 0.5 | A-28 | 0.1 | 0.7 | 0.005 | 2.1 | 2.2 |
| A-45 | 2.5 | A-29 | 0.5 | A-29 | 0.1 | 0.7 | 0.003 | 1.5 | 2.4 |
| A-46 | 2.5 | A-30 | 0.5 | A-30 | 0.1 | 0.7 | 0.003 | 2.4 | 2.5 |
| B-10 | 2.5 | A-17 | 0.5 | B-5 | 0.1 | 2.52 | 0.003 | −1.5 | 0.8 |
| B-11 | 2.5 | B-6 | 0.5 | B-8 | 0.3 | 0.7 | 0.004 | 0.4 | 0.6 |
| B-12 | 2.5 | B-7 | 0.5 | B-9 | 0.3 | 0.7 | 0.008 | −0.1 | 0.4 | same time. On the other hand, Samples B-5 to B-9, which lack at least one of the constituent elements of the present invention, cannot provide a sufficient improvement in 7 MHz output as well as 2 MHz output.

EXAMPLE 3

Samples A-31 to A-46 were prepared in the same manner as in Example 2 except that the nonmagnetic coating solution X was coated between the magnetic coating solution Y and the support to a dry thickness of 2.5 μm by simultaneous multi-layer coating method. The dry thickness of the magnetic coating compound Z is set forth in Table 3.

COMPARATIVE EXAMPLE 3

Sample B-10 was prepared in the same manner as in Comparative Example 2 except that as the first magnetic layer coating solution there was used the same coating compound as used in A-17 was used and as the second magnetic layer coating solution there was used the same coating solution as used in B-5.

Samples B-11 and B-12 were prepared in the same manner as B-8 and B-9 in Comparative Example 2 except that the nonmagnetic coating solution X was coated between Table 3 shows that Samples A-31 to A-46 according to the present invention provide a remarkable improvement in 7 MHz output and an improvement in 2 MHz output at the same time. On the other hand, Samples B-10 to B-12, which lack at least one of the constituent elements of the present invention, cannot provide a sufficient improvement in 7 MHz output as well as 2 MHz output.

Thus, Example 1 shows that the magnetic recording medium according to the present invention exhibits a high short wavelength output. Further, Example 2 shows that the magnetic recording medium according to the present invention exhibits a high output in short wavelength recording as well as long wavelength recording. It can also be seen that the magnetic recording medium of Example 3 exhibits the most excellent properties in the present invention.

As mentioned above, the present invention provides a magnetic recording medium comprising a nonmagnetic layer mainly having an inorganic nonmagnetic particle dispersed in a binder provided on a nonmagnetic flexible support and a magnetic layer having a ferromagnetic particle dispersed in a binder, characterized in that the magnetic layer comprises a hexagonal ferrite magnetic material and exhibits a thickness of 1 μm or less, or 2.5 μm or less in total if there are a plurality of magnetic layers, a central line average surface roughness of 0.006 μm or less, SFD of 0.3 or less in the longitudinal direction on the plane and Br/Hc of less than 1.5, whereby the short wavelength recording can be remarkably improved in electro-magnetic conversion characteristics, particularly 7 MHz output.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic layer having a nonmagnetic particle dispersed in a binder provided on a nonmagnetic flexible support and a magnetic recording layer having a magnetic material dispersed in a binder provided on the nonmagnetic layer, wherein the magnetic layer comprises a hexagonal ferrite magnetic material and has a thickness of 1 μm or less, a central line average surface roughness at a cut off value of 0.08 mm of 0.006 μm or less, a switching field distribution of 0.3 or less in the longitudinal direction, a coercive force of 1,000 to 4,000 Oe and a ratio of residual magnetic flux density to coercive force of less than 1.5.

2. A magnetic recording medium comprising a first magnetic layer having a ferromagnetic acicular particle dispersed in a binder provided on a nonmagnetic flexible support and a second magnetic layer having a magnetic material dispersed in a binder provided on the first magnetic layer, wherein the second magnetic layer comprises a hexagonal ferrite magnetic material, the total thickness of the magnetic layers is 2.5 μm or less, and the second magnetic layer has a central line average surface roughness at a cut off value of 0.08 mm of 0.006 μm or less, a switching field distribution of 0.3 or less in the longitudinal direction, a coercive force of 1,000 to 4,000 Oe and a ratio of residual magnetic flux density to coercive force of less than 1.5.

3. A magnetic recording medium comprising a nonmagnetic layer having a nonmagnetic particle dispersed in a binder provided on a nonmagnetic flexible support and first and second magnetic layers having a magnetic material dispersed therein provided on the nonmagnetic layer in this order, wherein the first magnetic layer comprises a ferromagnetic acicular particle, the second magnetic layer comprises a hexagonal ferrite magnetic material, the total thickness of the magnetic layers is 2.5 μm or less and the second magnetic layer has a central line average surface roughness at a cut off value of 0.08 mm of 0.006 μm or less, a switching field distribution of 0.3 or less in the longitudinal direction, a coercive force of 1,000 to 4,000 Oe and a ratio of residual magnetic flux density to coercive force of less than 1.5.

4. The magnetic recording medium as claimed in claim 1, wherein the thickness of the magnetic layer comprising a hexagonal ferrite is from 0.005 μm to 0.5 μm.

5. The magnetic recording medium as claimed in claim 2, wherein the squareness ratio of the second magnetic layer comprising a hexagonal ferrite magnetic material in the longitudinal direction is less than that of the first magnetic layer in the longitudinal direction and the squareness ratio of the first and second magnetic layers are in the following ranges, respectively:

0.7≦squareness ratio of the first magnetic layer
and 0.9≧squareness ratio of the second magnetic layer.

6. The magnetic recording medium as claimed in claim 2, wherein the maximum saturated magnetic flux density of the second magnetic layer in the longitudinal direction is less than that of the first magnetic layer in the longitudinal direction and the maximum saturated magnetic flux density of the first and second magnetic layers are in the following ranges, respectively:

1,500 G≦maximum saturated magnetic flux density of the first magnetic layer
and 2,500 G≧maximum saturated magnetic flux density of the second magnetic layer.

7. The magnetic recording medium as claimed in claim 2, wherein the coercive force of the second magnetic layer in the longitudinal direction is more than that of the first magnetic layer in the longitudinal direction and the coercive force of the first and second magnetic layers are in the following ranges, respectively:

500 Oe≦coercive force of the first magnetic layer≦2,500 Oe
and 1,000 Oe≦coercive force of the second magnetic layer≦4,000 Oe.

8. The magnetic recording medium as claimed in claim 2, wherein the thickness of the magnetic layer comprising a hexagonal ferrite is from 0.005 μm to 0.5 μm.

9. The magnetic recording medium as claimed in claim 2, wherein the ferromagnetic acicular particle in the first magnetic layer is a ferromagnetic metallic particle containing iron as a main component.

10. The magnetic recording medium as claimed in claim 2, wherein at least two of the nonmagnetic layer and the first and second magnetic layers are formed by a wet-on-wet coating process.

11. The magnetic recording medium as claimed in claim 3, wherein the squareness ratio of the second magnetic layer comprising a hexagonal ferrite magnetic material in the longitudinal direction is less than that of the first magnetic layer in the longitudinal direction and the squareness ratio of the first and second magnetic layers are in the following ranges, respectively:

0.7≦squareness ratio of the first magnetic layer
and 0.9≧squareness ratio of the second magnetic layer.

12. The magnetic recording medium as claimed in claim 3, wherein the maximum saturated magnetic flux density of the second magnetic layer in the longitudinal direction is less than that of the first magnetic layer in the longitudinal direction and the maximum saturated magnetic flux density of the first and second magnetic layers are in the following ranges, respectively:

1,500 G≦maximum saturated magnetic flux density of the first magnetic layer
and 2,500 G≧maximum saturated magnetic flux density of the second magnetic layer.

13. The magnetic recording medium as claimed in claim 3, wherein the coercive force of the second magnetic layer in the longitudinal direction is more than that of the first magnetic layer in the longitudinal direction and the coercive force of the first and second magnetic layers are in the following ranges, respectively:

500 Oe≦coercive force of the first magnetic layer≦2,500 Oe
and 1,000 Oe≦coercive force of the second magnetic layer≦4,000 Oe.

14. The magnetic recording medium as claimed in claim 3, wherein the thickness of the magnetic layer comprising a hexagonal ferrite is from 0.005 μm to 0.5 μm.

15. The magnetic recording medium as claimed in claim 3, wherein the ferromagnetic acicular particle in the first magnetic layer is a ferromagnetic metallic particle containing iron as a main component.

16. The magnetic recording medium as claimed in claim 3, wherein the nonmagnetic particle contained in the nonmagnetic layer comprises at least one of titanium dioxide, barium sulfate, zinc oxide and $\alpha$-iron oxide.

17. The magnetic recording medium as claimed in claim 3, wherein at least two of the nonmagnetic layer and the first and second magnetic layers are formed by a wet-on-wet coating process.

18. The magnetic recording medium as claimed in claim 2, wherein the ferromagnetic acicular particle in the first magnetic layer is a cobalt-modified iron oxide.

19. The magnetic recording medium as claimed in claim 3, wherein the ferromagnetic acicular particle in the first magnetic layer is a cobalt-modified iron oxide.

* * * * *